(12) United States Patent
Duran et al.

(10) Patent No.: US 8,263,511 B2
(45) Date of Patent: Sep. 11, 2012

(54) HIGH PURITY FUSED SILICA WITH LOW ABSOLUTE REFRACTIVE INDEX

(75) Inventors: Carlos Duran, Ottawa (CA); Richard Michael Fiacco, Corning, NY (US); Kenneth Edward Hrdina, Horseheads, NY (US); Daniel Raymond Sempolinski, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 166 days.

(21) Appl. No.: 12/644,563

(22) Filed: Dec. 22, 2009

(65) Prior Publication Data

US 2010/0162759 A1   Jul. 1, 2010

Related U.S. Application Data (60) Provisional application No. 61/141,924, filed on Dec. 31, 2008.

(51) Int. Cl.
*C03C 3/06* (2006.01)
*C03B 25/00* (2006.01)
(52) U.S. Cl. .......................................... 501/54; 65/117
(58) Field of Classification Search ............... 501/53, 501/54; 65/30.1, 30.11, 30.13, 117; 359/364, 359/727, 857
See application file for complete search history.

(56) References Cited

U.S. PATENT DOCUMENTS

| | | | |
|---|---|---|---|
| 6,342,697 B1 * | 1/2002 | Nagai et al. | 250/231.13 |
| 7,964,522 B2 * | 6/2011 | Moore et al. | 501/54 |
| 2006/0126053 A1 * | 6/2006 | Hinsberg et al. | 355/75 |
| 2007/0105704 A1 * | 5/2007 | Bookbinder et al. | 501/54 |
| 2009/0029842 A1 | 1/2009 | Khrapko et al. | |
| 2009/0203512 A1 | 8/2009 | Fiacco et al. | |

OTHER PUBLICATIONS

Agarwal, K.M., et al, A Simple IR Spectroscopic Method for Determining Fictive Temperature of Silica Glasses, Journal of Non-Crystalline Solids, vol. 185, pp. 191-198 (1995).
M. Daimon, et al, "High-Accuracy Measurements of the Refractive Index and its Temperature Coefficient of Calcium Fluoride in a Wide Wavelength Range from 138 to 2326 nm," Applied Optics, vol. 41, pp. 5275-5281 (2002).

* cited by examiner

*Primary Examiner* — Noah Wiese
(74) *Attorney, Agent, or Firm* — Robert P. Santandrea (57) ABSTRACT

A fused silica glass article having a low absolute refractive index and low concentrations of hydroxyl groups, halogens, and metal having a low absolute refractive index. The glass article contains less than about 10 ppm protium-containing and deuterium-containing hydroxyl groups by weight and less than about 20 ppm halogens by weight. The silica glass article also has an absolute refractive index (ARI) less than or equal to 1.560820. In one embodiment, the ARI of the fused silica article is achieved by lowering the fictive temperature of the fused silica. A method of lowering the fictive temperature is also described.

15 Claims, 9 Drawing Sheets

HIGH PURITY FUSED SILICA WITH LOW ABSOLUTE REFRACTIVE INDEX

CROSS-REFERENCE TO RELATED APPLICATIONS

This application claims the benefit of priority under 35 U.S.C. §119(e) of U.S. Provisional Application Ser. No. 61/141,924 filed on Dec. 31, 2008.

BACKGROUND

The invention relates to fused silica glass. More particularly, the invention relates to fused silica glass having a low absolute refractive index. Even more particularly, the invention relates to a method of providing the fused silica glass with a low absolute refractive index by lowering the fictive temperature of the glass.

Semiconductor optics requires fused silica having, among other things, good homogeneity, low birefringence and resistance to laser damage. Improved birefringence and resistance to laser damage may be achieved by providing fused silica glass having a low absolute refractive index (ARI). Low ARI levels have been achieved for fused silica glasses containing some metal contamination and/or dopants, such as halogens.

SUMMARY

The present invention meets these and other needs by providing a fused silica glass article having a low absolute refractive index and low concentrations of hydroxyl groups, halogens, and metals. The glass article contains less than about 10 ppm protium-containing and deuterium-containing hydroxyl groups by weight and less than about 20 ppm halogens by weight. The glass article also has an absolute refractive index (ARI) that is less than or equal to 1.560820. In one embodiment, the ARI of the fused silica article is achieved by lowering the fictive temperature of the fused silica.

Accordingly, one aspect of the invention is to provide a fused silica article. The fused silica article has a combined concentration of protium-containing hydroxyl groups and deuteroxyl groups of less than about 10 ppm and a fictive temperature of less than about 1060° C. The fused silica article also has an absolute refractive index of less than or equal to 1.560835 at a wavelength of about 193.368 nm.

A second aspect of the invention is to provide a fused silica article having a fictive temperature of less than 1060° C. and an anneal point of at least 1200° C., wherein the fused silica article has an absolute refractive index of less than or equal to 1.560835 at a wavelength of about 193.368 nm.

Another aspect of the invention is to provide a method of annealing a fused silica glass. The method comprises the steps of: providing a fused silica glass having an anneal point, an anneal rate, and a strain point; heating the fused silica glass to a first temperature above the anneal point; cooling the fused silica glass to a second temperature below the strain point at a progressively decreasing cooling rate that is less than the anneal rate, and cooling the fused silica glass from the second temperature to room temperature, thereby annealing the fused silica glass.

These and other aspects, advantages, and salient features of the present invention will become apparent from the following detailed description, the accompanying drawings, and the appended claims.

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range.

As used herein, "protium" refers to the hydrogen isotope (H) having a mass number of 1 and consisting of a single proton and electron. As used herein, the terms n(H) and n(H$_2$) refer to the total number of protium atoms and molecules, respectively, in a material, unless otherwise specified.

As used herein, the terms "protium-containing hydroxyl," "protium-containing OH," and "OH" refer to a moiety or a group of moieties each consisting of an oxygen atom and a protium atom ($_1^1$H, referred to herein as "H"), unless otherwise specified. As used herein, n(OH) means the total number of protium-containing hydroxyl moieties in a material, unless otherwise specified.

As used herein, "deuterium" refers to the hydrogen isotope ($_1^2$H) having one proton and one neutron in its nucleus. The symbols "D" and "D$_2$" refer to deuterium atoms and molecules, respectively, unless otherwise specified. As used herein, the terms n(D) and n(D$_2$) refer to the total number of deuterium atoms and molecules, respectively, in a material.

As used herein, the terms "deuteroxyl" and "OD" refer to a moiety or a group of moieties, each consisting of an oxygen atom and a deuterium atom ($_1^2$H or $_1^2$D, referred to herein as "D"). As used herein, n(OD) means the total number of OD moieties in a material. When protium-containing hydroxyl groups and deuteroxyl groups are present in their naturally occurring isotopic abundances or distribution, the ratio of n(OD)/(n(OD)+n(OH)) in the material is equal to $2\times10^{-4}$.

As used herein, the terms "$H_2$," "hydrogen," and "molecular hydrogen" refer to the naturally occurring mixture of protium and deuterium molecules and atoms (99.98% protium and 0.02% deuterium), unless otherwise stated.

As used herein, the term "hydrogen species" refers to any combination of the naturally occurring isotopes of hydrogen. Unless otherwise stated, hydrogen species include, for example: the naturally occurring mixture of protium and deuterium atoms and molecules; any other mixture of protium and deuterium atoms, molecules, and mixtures thereof; pure protium atoms, molecules, and mixtures thereof; and pure deuterium atoms, molecules, and mixtures thereof, unless otherwise stated.

Unless otherwise specified, when reference is made to any element other than hydrogen, it is understood that the element is present in its naturally occurring state; i.e., the relative abundance of isotopes of the element is that which occurs in nature, and the element is not enriched in any one isotope.

As used herein, the terms "Absolute Refractive Index" and "ARI" refer to the refractive index of a material in relation to that of a vacuum.

As used herein, the terms "anneal" and "annealing" refer to a process of slowly cooling glass to relieve internal stresses after formation of the glass. The term "anneal point" refers to the temperature at which a glass has a viscosity of $10^{13}$ Poise. The anneal point is generally understood to be the temperature the glass is still too hard to deform, but is soft enough to relax the stresses in the glass. The term "strain point" as used herein refers to the temperature at which a glass has a viscosity of $10^{14.5}$ Poise.

A fused silica article having improved resistance to laser damage is provided. The fused silica article contains up to about 10 ppm by weight of at least one of protium-containing hydroxyl groups and deuteroxyl groups. In one embodiment, the combined concentration of hydroxyl groups and deuteroxyl groups in the fused silica article is less than or equal to about 5 ppm by weight and, in another embodiment, the combined concentration of protium-containing hydroxyl groups and deuteroxyl groups is less than or equal to about 2 ppm by weight. In one embodiment, the proportion of deuteroxyl groups to the sum of hydroxyl and deuteroxyl group is equal to the natural isotopic abundance of deuterium; i.e., n(OD)/(n(OD)+n(OH))=$2\times10^{-4}$. In another embodiment, the concentration of deuteroxyl groups in the fused silica sample is greater than the natural isotopic abundance of deuterium; i.e., n(OD)/(n(OD)+n(OH))>$2\times10^{-4}$.

The fused silica article, in one embodiment also has a total halogen (i.e., fluorine, chlorine, bromine) concentration of less than about 10 ppm by weight. In a second embodiment, the fused silica article comprises less than about 5 ppm halogens by weight in a second embodiment, and less than about 1 ppm halogens by weight in a third embodiment. In a fourth embodiment, the fused silica article is substantially free of halogens; i.e., the halogens are present in concentrations that are below the detection limits of those analytical methods and means that are routinely used in the art.

Methods of making fused silica glass that are either halogen free or have low halogen concentrations and low hydroxyl (both protium- and deuterium-containing hydroxyl groups) concentrations are described in U.S. patent application Ser. No. 11/881,599, by Rotislav R. Khrapko et al., entitled "Fused Silica Having Low OH, OD Levels and Method of Making," filed on Jul. 27, 2007; and U.S. Provisional Patent Application No. 61/063,894, by Richard M. Fiacco et al., entitled "Halide Free Glasses Having Low OH, OD Concentrations," filed Feb. 7, 2008. The contents of both of these patent applications are incorporated by reference herein in their entirety.

A silica soot blank—or preform—is first provided. The silica soot blank may be formed by methods known in the art such as, but not limited to, deposition methods in which a gas stream containing at least one silicon-containing precursor compound in vapor form is produced. The gas stream containing the silicon-containing compound is passed into the flame of a combustion burner to form amorphous particles of fused silica soot via either flame hydrolysis or combustion. The fused silica particles are deposited onto a support, such as a supporting core cane, a mandrel, or the like to form the silica soot blank. The support may be removed following deposition of the soot.

In those embodiments where a fused silica article comprising a concentration of deuteroxyl (OD) groups that is greater than the naturally occurring concentration of OD groups is desired, OD groups may be exchanged for protium-containing hydroxyl (OH) groups in the soot blank using a process in which gases comprising up to 100% $D_2O$, or, preferably, 0.5-3% $D_2O$ are flowed past the perform at temperatures in a range from about 500° C. up to about 1300° C. for a time period ranging from about 0.5 hours up to about 1000 hours. In one embodiment, the time period ranges from about 1 hour up to about 10 hours. In another embodiment, the gases comprising $D_2O$ are flowed past the preform at temperatures in a range from about 1000° C. up to about 1200° C.

The silica soot blank is then dried—i.e., dehydrated—by exposing the soot blank to carbon monoxide (CO) to reduce the combined concentration of protium-containing OH and OD in the soot blank below a predetermined level. The silica soot blank is exposed to CO at a temperature in a range from about 900° C. up to about 1400° C. In one embodiment, the silica soot blank is exposed to CO at a temperature in a range from about 1200° C. up to about 1300° C. Unless otherwise specified, the drying step is carried out in an atmosphere in which the gas is continuously flowed or "swept" over the soot blank. In those embodiments where the atmosphere does not consist solely of CO, the atmosphere may further comprise at least one inert or relatively unreactive gas such as, but not limited to, helium, argon, nitrogen, neon, and the like.

In one embodiment, the drying step is carried out in a substantially halogen-free atmosphere. In one embodiment, the halogen-free atmosphere comprises from about 0.5% up to about 10% carbon monoxide. In one particular embodiment, the halogen-free atmosphere comprises about 1% CO. The mechanism for drying may be based on the reaction between CO and hydroxyl species (protium-containing OH and OD) to yield molecular hydrogen species (e.g., $H_2$, HD, $D_2$) and carbon dioxide.

Following drying of the silica soot blank with CO, the silica soot blank is heated at a temperature in a range from about 1000° C. up to about 1260° C. in an atmosphere comprising oxygen and an inert gas such as, but not limited to, helium. The oxygen should essentially be free of water. The oxygen concentration in the oxygen-helium mixture ranges from about 0.1% up to 100%. In one embodiment, the oxygen concentration is in a range from about 0.5% up to about 5%. In one particular embodiment, the dried soot blank is heated at 1225° C. for one hour in an atmosphere comprising 2% oxygen in helium. The sweeping of the dried soot blank with a mixture of oxygen and helium ensures complete conversion of CO to carbon dioxide ($CO_2$) and repairs any damage to the soot blank caused by CO drying. The oxygen sweep also re-oxidizes the silica and prevents formation of any oxygen-deficient centers.

The open porosity of the silica soot blank enables more effective drying and removal of water, protium-containing hydroxyl groups, and deuteroxyl groups by carbon monoxide. Open porosity also allows the oxygen sweep to better permeate the soot blank and more effectively mitigate any damage to the silica caused by the CO drying step.

After the soot blank has been dried and, optionally, swept with an oxygen-helium mixture as described above, the dried silica soot blank is sintered or consolidated under conditions that are known in the art to form the fused silica article described herein. In one embodiment, the soot blank is consolidated at a temperature of up to about 1500° C. in an inert gas atmosphere containing from 0.5% up to 2% oxygen to form the fused silica article.

In order to obtain the desired final dimensions and shape, the consolidated fused silica article may optionally be re-worked by those means known in the art, such as, but not limited to, rolling out, squashing, and the like.

The consolidated fused silica article may optionally be loaded with at least one of the molecular hydrogen species, including molecular protium (($_1^1$H)$_2$), the mixed protium-deuterium molecular species HD, and molecular deuterium ($D_2$) by heating the fused silica article in the presence of an atmosphere comprising hydrogen in its naturally occurring isotopic mixture (i.e., 99.98% protium, 0.02% deuterium) or hydrogen that has been enriched in either deuterium or protium. Such molecular species react with and neutralize any residual oxygen-rich species, forming small amounts of corresponding protium-containing hydroxyl and/or deuteroxyl species. In one embodiment, the consolidated fused silica article is heated at about 425° C. and held for at that temperature for 14 days under an atmosphere comprising 4% $H_2$ with the balance being nitrogen pressurized to 78.3 psig. After the specified time period at 425° C., the furnace is allowed to cool to room temperature (i.e., 25° C.).

At temperatures below about 500° C., molecular hydrogen species (i.e., $H_2$, HD, $D_2$) are incorporated into fused silica with little reaction with the $SiO_2$ lattice. At temperatures greater than about 500° C., however, molecular hydrogen species react with the lattice, forming silicon hydride (SiH) and silicon hydroxide (SiOH) (i.e., silicon hydrides or hydroxides comprising protium and/or deuterium). Generally, as the initial protium-containing hydroxyl and/or deuteroxyl content of the fused silica glass decreases and the temperature at which the fused silica is loaded with molecular hydrogen species, more reaction of the hydrogen species takes place, yielding more SiH and SiOH. Loading of fused silica at temperatures of less than 500° C. and, in one embodiment, between 30° C. and 500° C., is therefore preferable to minimize the effects of these species.

To achieve the concentration levels of protium-containing OH and/or OD described herein, the method described hereinabove is carried out in a furnace environment in which the amount of water (i.e., $H_2O$, $D_2O$, HDO) is maintained at low levels. The maintenance of low water levels within the furnace keeps the concentrations of protium-containing OH and OD groups in the fused silica article below the desired levels. Small leaks within the furnace allow ambient air to enter the furnace, resulting in a significant partial pressure of water within the furnace. Accordingly, the amount of leakage of ambient air into the furnace must be minimized using those means known in the art. In one embodiment, such leakage is minimized or neutralized by maintaining the interior of the furnace at a pressure that is greater than ambient pressure, thus preventing or minimizing the ingress of water vapor into the furnace.

The distribution of both protium- and deuterium-containing hydroxyl groups throughout the fused silica article, particularly if the soot blank has been doped with at least one of protium-containing OH and OD as described above, is homogenous. The combined concentration of protium-containing OH and OD at any given point in the fused silica article varies by less than 4 ppm from the mean combined concentration of protium-containing OH and OD. In one embodiment, the combined protium-containing OH and OD concentration at any given point in the fused silica article varies by less than 2 ppm from the mean combined protium-containing OH and OD concentration. In those embodiments where the mean combined concentration of protium-containing OH and OD is less than 1 ppm, the combined concentration of protium-containing OH and OD at any given point in the fused silica article varies by less than 0.4 ppm from the mean combined protium-containing OH and OD concentration and, in another embodiment, the combined concentration of protium-containing OH and OD at any given point in the fused silica article varies by less than 0.2 ppm from the mean combined OH and OD concentration.

The presence of alkali metals, alkaline earth metals, transition metals, and non-metals, such as germanium and the like, lead to transmission loss at a wavelength of about 193 nm. It is therefore desirable that such materials be present at very low concentrations. Accordingly, the total concentration of metals and non-metals, including alkali, alkali earth, and transition metals, in the fused silica article described herein is less than about 20 ppb by weight. In another embodiment, the fused silica article comprises less than about 10 ppb metals by weight and, in yet another embodiment, the fused silica article comprises less than about 5 ppb metals by weight. Non-limiting examples of such contaminants include sodium, potassium, lithium, iron, germanium, copper, titanium, zirconium, and the like.

The fused silica article has an absolute refractive index (ARI), measured at a wavelength of 193.368 nm, of up to about 1.560835. In another embodiment, the ARI of the fused silica article is less than or equal to about 1.560820. In a third embodiment, the absolute refractive index of the fused silica article is less than or equal to 1.560815. In a fourth embodiment, the fused silica article has an ARI of less than or equal to 1.506810.

Figure 1:
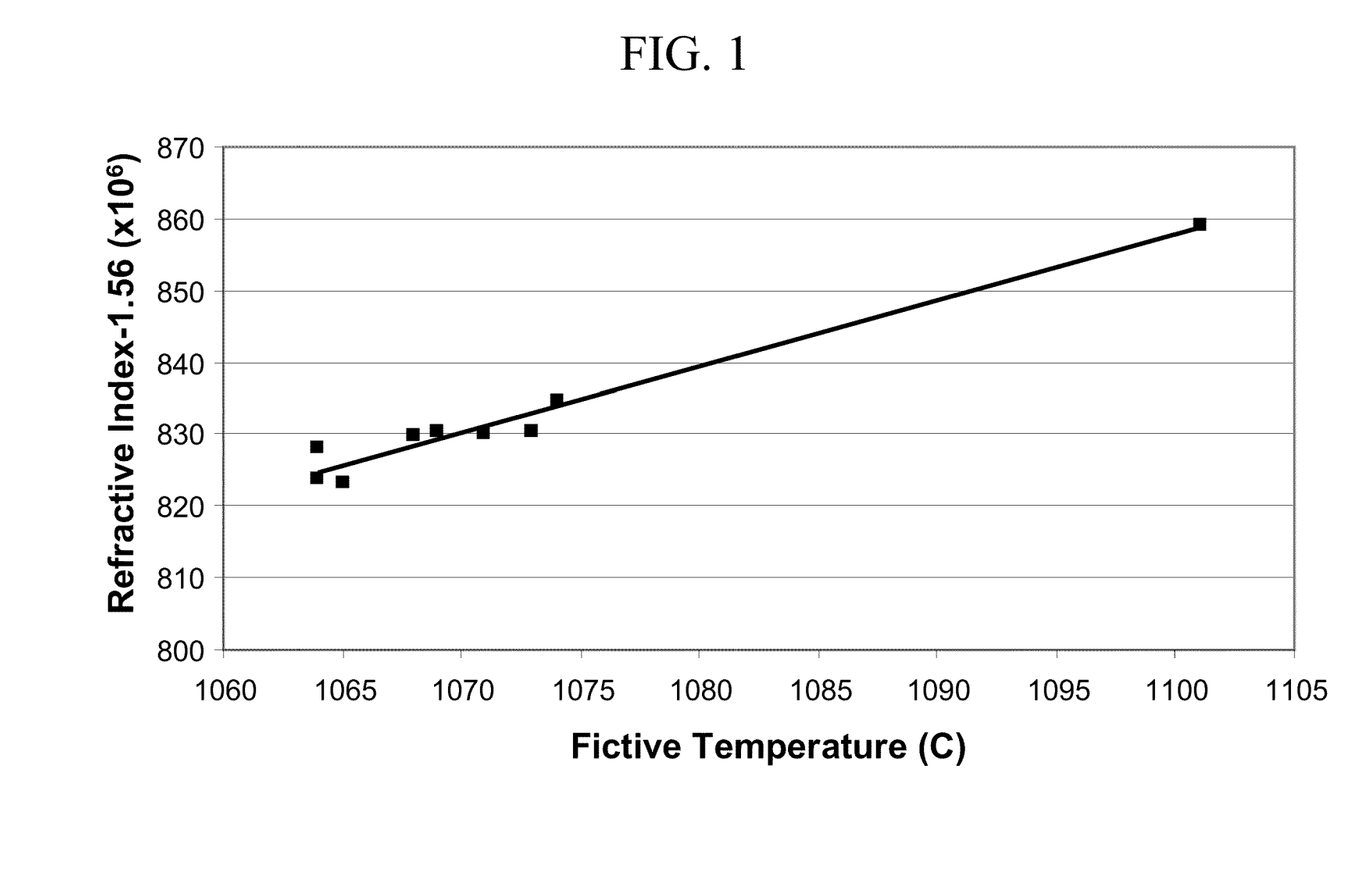
FIG. 1 is a plot of measured absolute refractive index (ARI) of a high purity, halogen-free fused silica sample having low OH and OD concentration as a function of measured fictive temperature.

ARI correlates closely with fictive temperature $T_f$. FIG. 1 is a plot of ARI measured for a high purity, halogen-free fused silica sample having low protium-containing OH and OD concentrations as a function of measured fictive temperature. The fused silica glass described herein also possesses a low fictive temperature $T_f$. The fused silica article described herein has a fictive temperature $T_f$ of less than about 1060° C. In one embodiment, the fused silica article has a fictive temperature of less than about 1055° C., and, in another embodiment, $T_f$ is less than about 1050° C. In a fourth embodiment, $T_f$ is less than about 1038° C.

Figure 2:
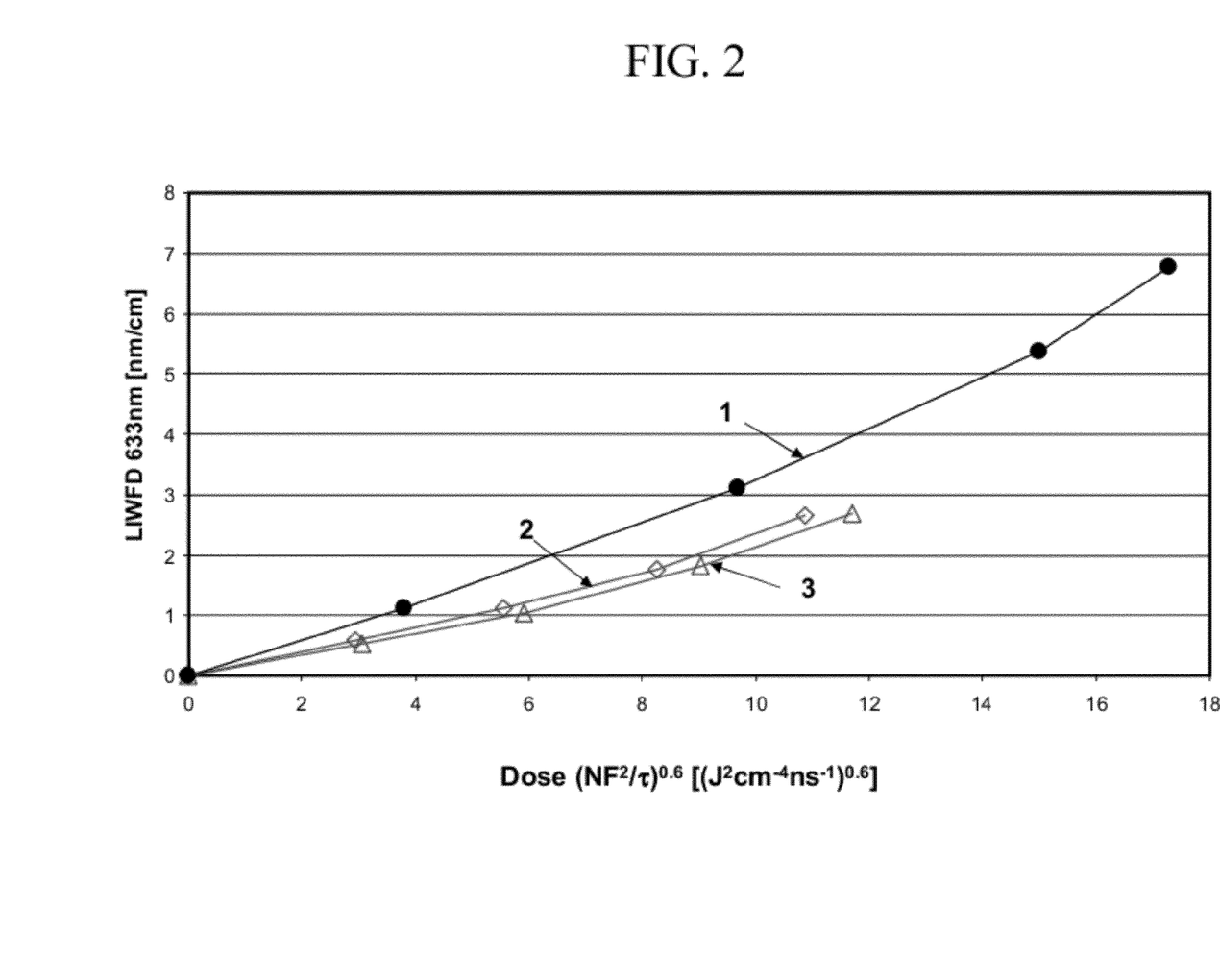
FIG. 2 is a plot of laser induced wavefront distortion (LIWFD) as a function of dose for fused silica samples.

The fused silica article described herein provides improved laser damage resistance and birefringence by achieving a low absolute refractive index. The low ARI value of the fused silica article is believed to be indicative of the presence of a relaxed, low-stress structure in the glass. The low stress structure is more resistant to defect formation caused by interaction with the laser. This particularly advantageous when the fused silica article is an optical component that is used within a photolithography apparatus. The improvement in resistance to laser damage with decreasing ARI is shown in FIG. 2. FIG.

2 is a plot of laser induced wavefront distortion (LIWFD) as a function of dose for: a reference sample containing 60 ppm OH, where OH is the naturally occurring mixture of protium and deuterium containing hydroxyl groups (curve 1 in FIG. 2); a sample having a fictive temperature of 1121° C. and containing 0.5 ppm protium-containing OH, 2.2 ppm OD, and $0.6 \times 10^{17}$ molecules/cm$^3$ H$_2$ (curve 2 in FIG. 2); and a sample having a fictive temperature of 1057° C. and containing 0.3 ppm protium-containing OH, 2.2 ppm OD, and $0.6 \times 10^{17}$ molecules/cm$^3$ H$_2$ (curve 3 in FIG. 2). As previously stated, ARI correlates closely with a fictive temperature $T_f$. It has been previously observed that a decrease in LIWFD is observed with decreases in protium-containing OH and OD levels. The fused silica of the present invention, however, represents a further improvement in that a decrease in fictive temperature further reduces the amount of LIWFD observed. As seen in FIG. 2, at roughly equal OH and OD concentrations, the sample with the lowest fictive temperature (3 in FIG. 2) consistently exhibits greater resistance to laser damage than the sample having a higher $T_f$.

In one embodiment, the fused silica article described herein has a laser induced wavefront distortion (LIWFD) of less than 3 nm/cm at 633 nm and less than 4.5 nm/cm at 193 nm when subjected to 4 billion ($4 \times 10^9$) pulses of an ArF laser, each of the pulses having a fluence of 0.5 mJ/cm$^2$ and an integral-square pulse width of 20 ns. In addition, the fused silica article described herein has a polarization induced birefringence (PIB) of less than 0.05 nm/cm at 633 nm and less than 0.07 nm/cm at 193 nm when subjected to 4 billion ($4 \times 10^9$) pulses of an ArF laser, each of the pulses having a fluence of 0.5 mJ/cm$^2$ and an integral-square pulse width of 20 ns.

Laser damage resistance to the fused silica described herein was quantified by exposing 100 mm long bar-shaped silica samples to linearly polarized light from a 4 kHz ArF excimer laser. Fluence, pulse width, and beam profile were monitored regularly throughout the exposure period. The exposing beam has a circular cross section with a diameter of 3 mm and the target beam profile is a flat top-hat shape. At pre-defined pulse counts during exposure, the samples were removed from the apparatus and measured for laser induced wavefront deformation in two interferometers operating at 193 and 633 nm, respectively. The laser induced index change in the exposed volume relative to its unexposed surroundings is then measured by analyzing the wavefront map with a suitable numerical spatial filter. The extracted data are then plotted against the cumulative dose, sometimes referred to as the standard compaction dose in literature, calculated as $(NF2/\tau)^{0.6}$, with N being the number of laser pulses, F the fluence (pulse energy per unit area), and $\tau$ the integral-square pulse width.

The viscosity of the fused silica glass described herein is relatively high, due to the low concentrations or absence of halogens and both protium- and deuterium-containing hydroxyl groups. Consequently, conventional annealing procedures that are needed to achieve these low ARI values require extremely long times. Accordingly, a novel method of annealing such fused silica glasses is provided herein. The method comprises heating the fused silica glass to a first temperature above the anneal point of the glass and cooling from the first temperature to a second temperature that is below the strain point of the glass at a progressively decreasing cooling rate. The progressively decreasing cooling rate is typically non-linear, comprising multiple cooling steps in which the cooling rate is decreased from one step to the next. The progressively decreasing cooling rate, for example, includes a first cooling step in which the fused silica glass is cooled from a first temperature $T_1$ to a second temperature $T_2$ at first cooling rate $r_1$, and then to a third temperature $T_3$ at a second cooling rate $r_2$, wherein strain point$>T_1>T_2>T_3>$room temperature and $r_1>r_2$. The progressively decreasing cooling rate is less than the optimum anneal rate of the fused silica glass. As used herein, the term "optimal anneal rate" is the annealing or cooling rate at which the change in fictive temperature $T_f$ with respect to time t (i.e., $dT_f/dt$) assumes a local maximum value. The fused silica glass is cooled at a rate such that the difference between the temperature T and the fictive temperature $T_f$ of the fused silica glass is less than a predetermined optimal value and within a predetermined range of the optimal value. The method described herein is based upon experimental data obtained from samples having low protium-containing OH and OD concentrations and numerically modeled data.

Halogen-free fused silica glass samples having low protium-containing OH and OD concentrations were prepared according to the methods previously detailed herein and described in U.S. patent application Ser. Nos. 11/881,599 and 61/063,894. All samples were annealed by first heating at a rate of 10° C./min to 1200° C. in an atmosphere that would prevent the sodium level in glass from exceeding about 10 ppb. The samples were held at 1200° C. for 2 hours. Individual samples were then cooled to 1000° C. at different rates, listed in Table 1. All samples were then cooled from 1000° C. to room temperature (i.e., 25° C.) at a rate of 10° C./min. The fictive temperatures measured for each cooling rate are listed in Table 1, as are fictive temperatures obtained from phenomenological modeling, which is described below. As can be seen from the results listed in Table 1, lower cooling rates result in lower fictive temperatures. In addition, better agreement between measured and modeled fictive temperatures is obtained when lower cooling rates are used.

Fictive temperature $T_f$ measurements described herein were made following the method described by A. Agarwal et al. (Journal of Non-Crystalline Solids, vol. 185, pp. 191-198 (1995)), in which the position of the fundamental structural band at about 1122 cm$^{-1}$ is monitored in the infrared reflection mode and an overtone of this band at about 226 cm$^{-1}$ is monitored in the infrared transmission mode. The fictive temperature in a glass has been correlated to the average Si—O—Si bond angle in the glass structure. The average bond angle can be measured through FTIRS (Fourier Transform Infrared Spectroscopy) with very good reproducibility (i.e., within about 2° C.) on thin glass samples. The technique can be implemented using a measurement spot size of ~5 mm, which allows verification of $T_f$ uniformity within the sample.

TABLE 1

Experimental fictive temperatures obtained for different annealing cycles.

| Anneal Cycle | Cooling Rate (° C./hr) | Measured Fictive Temperature (° C.) | Modeled Fictive Temperature (° C.) |
| --- | --- | --- | --- |
| 1 | 0.5 | 1053 | 1052.6 |
| 2 | 1 | 1066 | 1066.3 |
| 3 | 2 | 1074 | 1078.9 |
| 4 | 5 | 1091 | 1097.7 |
| 5 | 10 | 1107 | 1112.5 |
| 6 | 30 | 1129 | 1136.5 |

A phenomenological annealing model was developed from the experimental data. The model was then used to develop heating schedules that are used to produce other low $T_f$ glasses. The model is based on the premise that a glass having a structure characterized by a certain $T_f$, when held at a temperature T, will relax by changing its $T_f$ so that $T_f$ approaches temperature T. Further, the model assumes that the relaxation is of the form:

$$T_f(t)=T+(T_f(0)-T)\cdot\exp(-t/\tau),$$

where t is the time elapsed since the glass was brought to temperature T, and $T_f(0)$ is the glass $T_f$ at that instant. The model also assumes that the relaxation is characterized by a time constant $\tau$. For a glass having a given composition, time constant $\tau$ is a function of only the temperature T, and not of the fictive temperature $T_f$. The time constant $\tau$ is assumed to depend on T through the temperature dependence of the glass viscosity $v$:

$$\tau(T)=v(T)/\alpha$$

where $\alpha$ is a material-specific, temperature independent parameter. The glass viscosity $v$ can be measured by independent techniques known in the art such as, for example, beam bending and parallel plate techniques. Alternatively, the temperature dependence of the viscosity can be determined experimentally by annealing glass samples at prescribed uniform rates of cooling.

Glasses usually exhibit a viscosity that is strongly temperature dependent. The viscosity can generally be approximated by an exponential of the form:

$$v(T)=\exp(a+b/T)$$

where a and b are parameters obtained empirically from fitting experimental data. The strong temperature dependence of the viscosity directly translates into an equally strong dependence of the relaxation rate $\tau(T)$. In practical terms, this means that the rate of change of $T_f$ during the typical temperature range used in a normal annealing process can vary by several orders of magnitude. Thus, in order to obtain low $T_f$ within a timeframe that is practical for a glass manufacturing process, the annealing schedule must take this variation into account.

Figure 3:
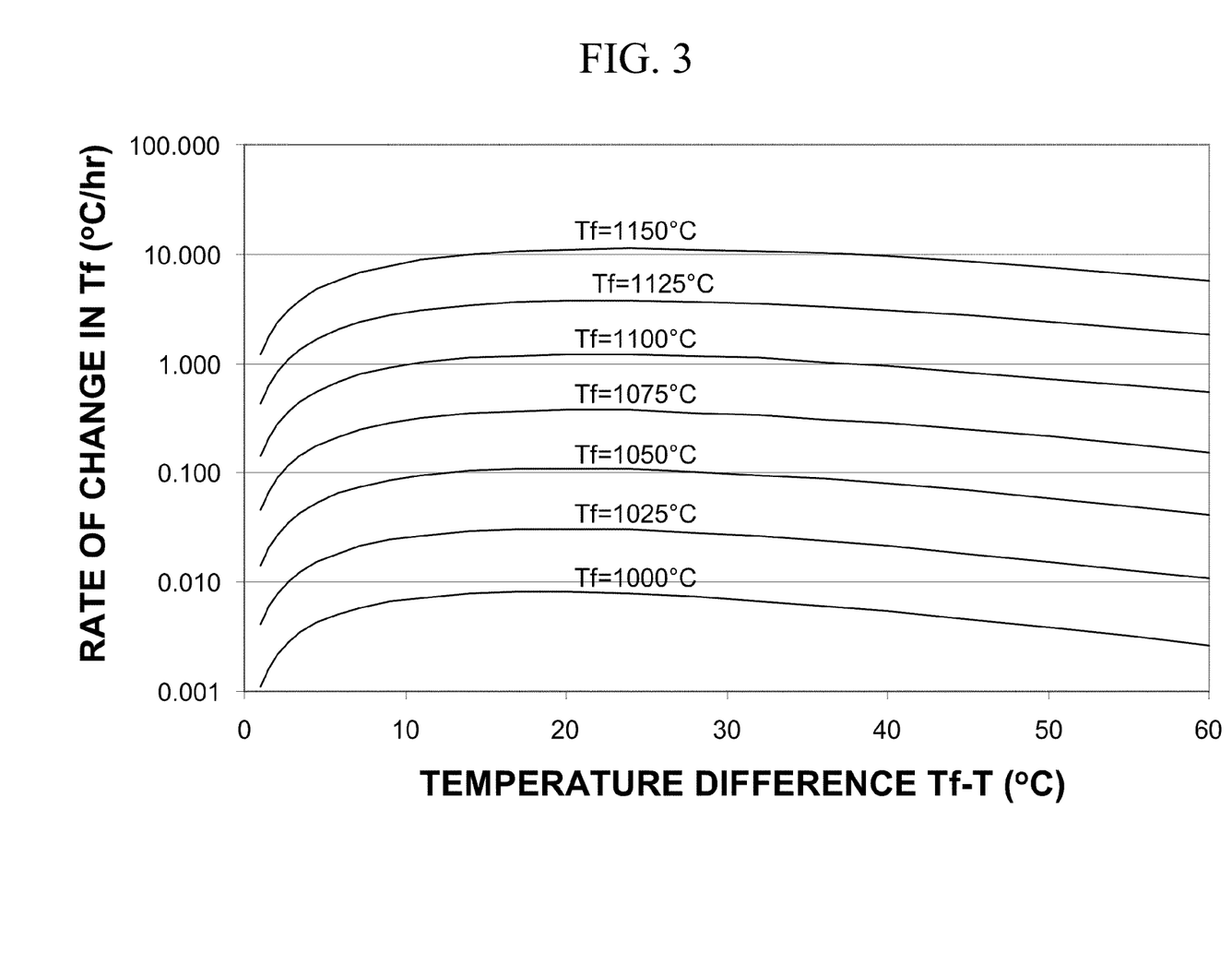
FIG. 3 is a plot of rates of change of fictive temperature $T_f$ as a function of the difference between $T_f$ and the temperature of the glass T for several glasses of different $T_f$.

FIG. 3 is a plot of calculated rates of change (i.e., decrease) of $T_f$ as a function of the difference between $T_f$ and the temperature of the glass T, $T_f-T$, for several glasses having different $T_f$ values. The results of the calculations, plotted in FIG. 3, show that, for a given $T_f$, there is an optimum temperature T at which the rate of decrease of $T_f$ is optimized This optimum difference does not change significantly with $T_f$, and is about 20° C. for the glasses described herein. However, for a change of 50° C. in $T_f$ the maximum attainable rate diminishes by more than an order of magnitude. The goal of an efficient anneal schedule is to gradually change the glass temperature so that the difference $T_f-T$ is always at or close to the optimum value for each temperature. Since the curves plotted in FIG. 3 are sensitive to details in the model and uncertainties in the glass relaxation rate, an anneal schedule that operates at the maximum rate is potentially unstable. In the event that the relaxation rate is somewhat slower than the modeled rate, the temperature difference $T_f-T$ will increase, further diminishing the $T_f$ anneal rate; i.e., $T_f-T$ increases beyond its optimum value, and the anneal rate is less efficient to the point that the fictive temperature $T_f$ no longer changes, creating a "runaway" state or situation. This runaway situation will result in a final $T_f$ that is different from the desired $T_f$. On the other hand, a cycle that seeks to maintain a difference that is smaller than the optimum difference will to some extent compensate for inaccuracies in the model, since an increase in temperature difference will result in an increase in the anneal rate of $T_f$.

The fact that the curves shown in FIG. 3 are relatively flat near their maxima means that a practical annealing schedule can be designed to operate several degrees Celsius below the maximum while still achieving an annealing rate that is only slightly less than optimal. This approach was followed in designing the annealing schedules (shown in FIG. 4) needed to obtain the absolute refractive index values listed in Table 3. Table 2 lists the steps that produce some of the temperature profiles shown in FIG. 4.

TABLE 2

Figure 4:
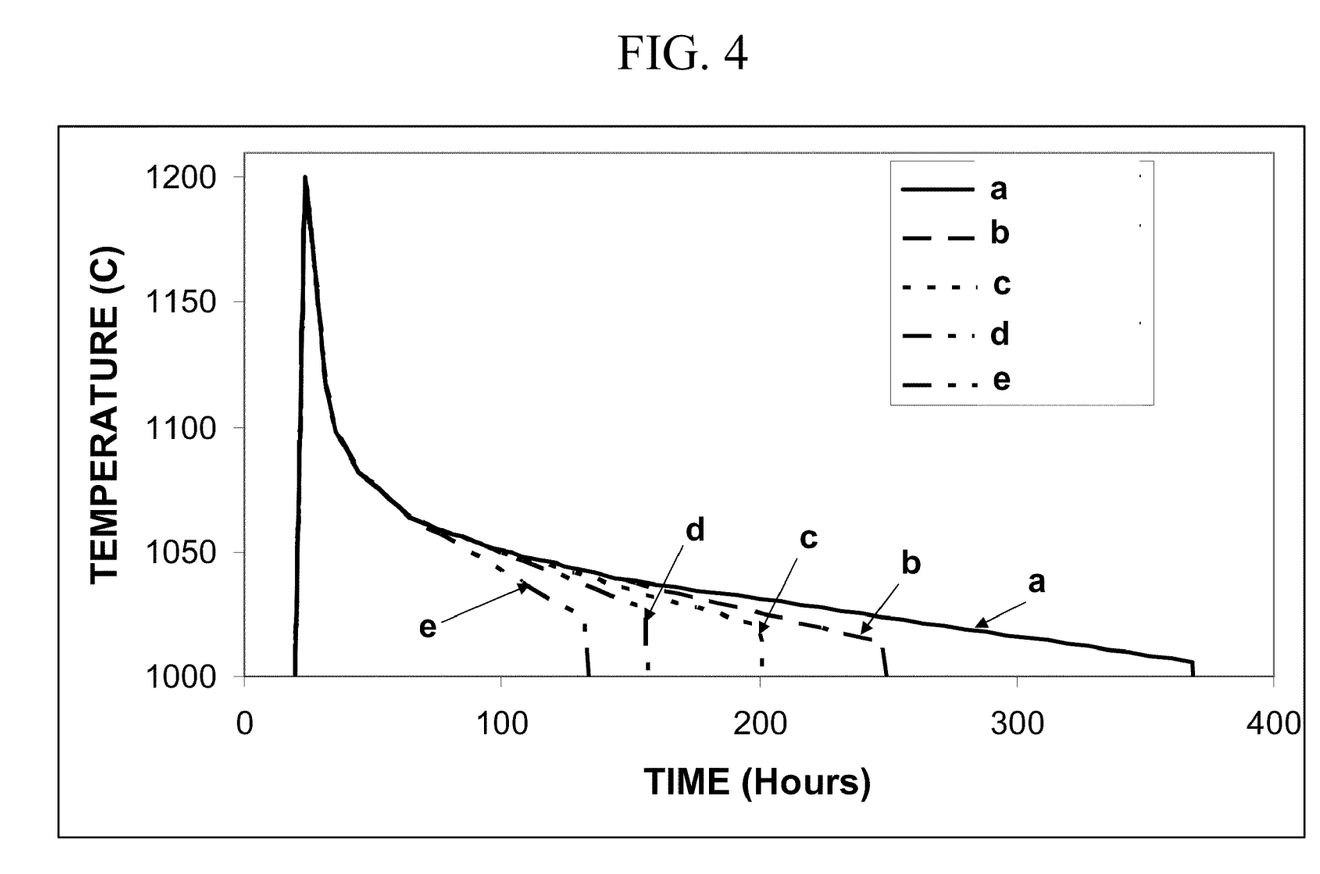
FIG. 4 is a plot of annealing schedules designed to obtain the ARI values listed in Table 3.

Temperature ramping steps used in generating three of the temperature schedules plotted in FIG. 4.

| Step | Schedule a | Schedule c | Schedule e |
|---|---|---|---|
| 1 | | Room Temp → 1200° C. at 50° C./hr | |
| 2 | | Hold at 1200° C. for 1 hr | |
| 3 | | 1200° C. → 1122° C. at 13° C./hr | |
| 4 | | 1122° C. → 1098° C. at 4.8° C./hr | |
| 5 | | 1098° C. → 1082° C. at 2° C./hr | |
| 6 | | 1082° C. → 1064° C. at 0.9° C./hr | |
| 7 | | 1064° C. → 1052° C. at 0.4° C./hr | 1064° C. → 1022° C. at 0.6° C./hr |
| 8 | 1052° C. → 1039.5° C. at 0.25° C./hr | 1052° C. → 1019° C. at 0.3° C./hr | 1022° C. → Room Temp at 30° C./hr |
| 9 | 1039.5° C. → 1005° C. at 0.15° C./hr | 1019° C. → Room Temp at 30° C./hr | — |
| 10 | 1005° C. → Room Temp at 30° C./hr | — | — |

Table 3 lists fictive temperatures, determined by the model described herein, needed to obtain ARI values ranging from 1.560820 t0 1.560798. For comparison, fictive temperatures determined from the plot of ARI versus $T_f$ shown in FIG. 1 are also listed in Table 3. The changes in ARI produced by changes in the annealing schedule are small. The total change in absolute index between un-annealed glass and glass annealed according to the longest schedule shown in Table 3 is less than $10^{-4}$. Precise measurements are therefore required in order to distinguish the ppm-level changes typically effected by changes in the annealing schedule. The best known absolute method used to determine these changes is the minimum deviation angle method, applied using a high precision goniometer and a controlled atmosphere, as described by M. Daimon and A. Masumura (Applied Optics, vol. 41, pp. 5275-5281 (2002)).

TABLE 3

Modeled data showing heat treatments needed to obtain ARI.

| Anneal Cycle | $T_f$(° C.) Model | FIG. 1 Fit | ARI (193.3 nm) |
|---|---|---|---|
| a | 1038.2 | 1038.4 | 1.560798 |
| b | 1046.7 | 1046.1 | 1.560806 |
| c | 1051.7 | 1050.6 | 1.560810 |
| d | 1058.4 | 1056.7 | 1.560816 |
| e | 1062.9 | 1060.8 | 1.560820 |
| f | 1052.7 | 1051.5 | 1.560811 |

Figure 5:
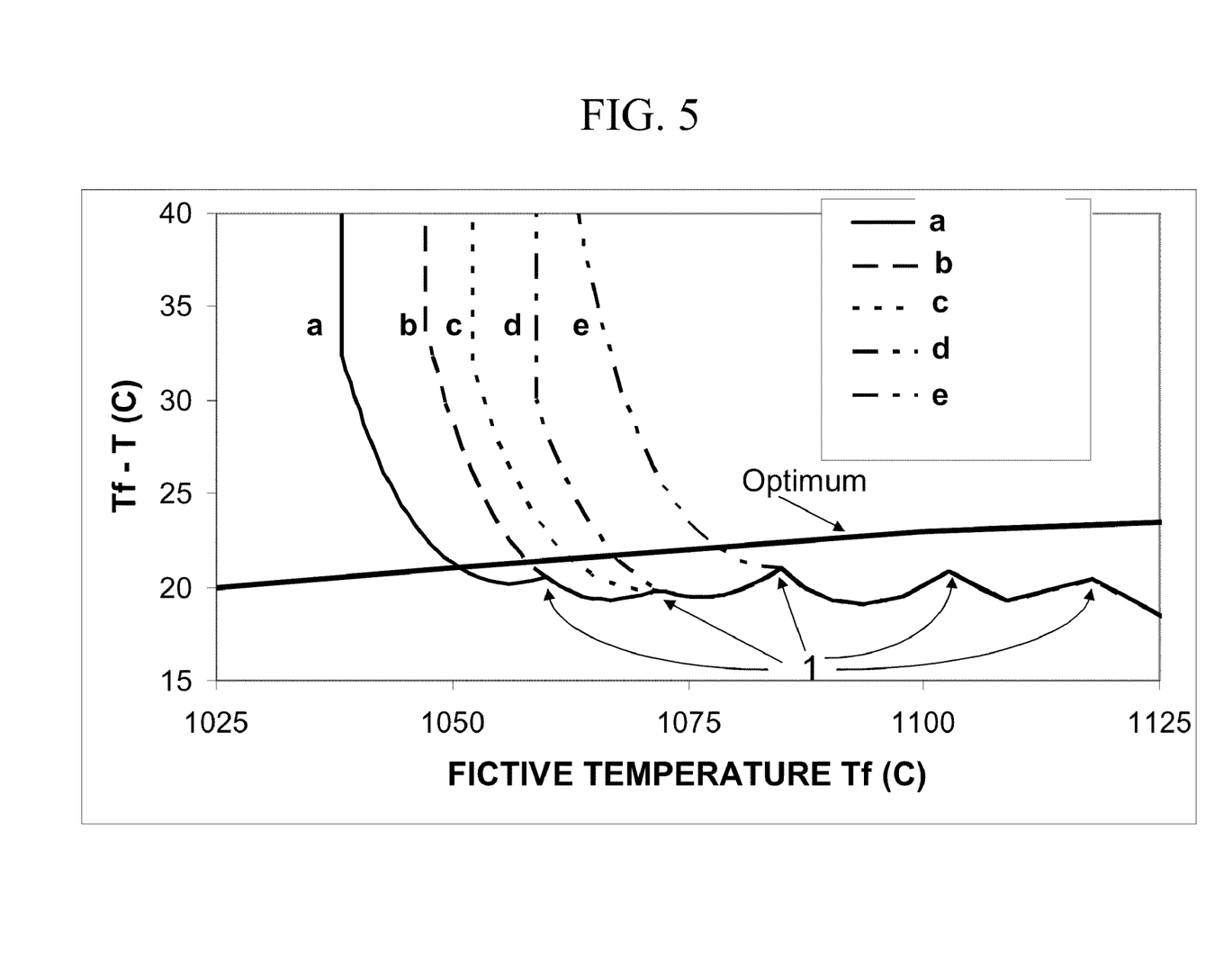
FIG. 5 is a plot of the calculated difference between current values of $T_f$ and the glass temperature T as a function of fictive temperature for the annealing cycles shown in FIG. 4.

The calculated difference $T_f$-T between the instantaneous values of T and $T_f$ versus current $T_f$ for the same cycles shown in FIG. 4 is plotted in FIG. 5. The position of the optimum $T_f$-T difference (labeled "optimum" in FIG. 5), which maximizes the anneal rate, is given by the positions of the maxima of the curves shown in FIG. 3. Each of the annealing schedules listed in Table 2 consists of a series of temperature ramps, each having a constant cooling rate. At the beginning of each step, the cooling rate is slower than the anneal rate at the current $T_f$, thus resulting in a decrease in the difference $T_f$-T. As cooling progresses at a constant rate, the anneal rate decreases and the difference $T_f$-T begins to grow after passing through a minimum. When the temperature difference $T_f$-T gets too close to the optimum difference, the cycle changes to a new, slower rate of cooling that causes the difference $T_f$-T to start decreasing again. The points at which step changes occur in various anneal cycles are marked by cusp points (1 in FIG. 5).

FIG. 5 allows the safety margin (i.e., the range below the optimum anneal rate in which a runaway situation will be avoided) of the anneal cycle to be readily ascertained. Cooling rates may be slowed, for example, in order to shift an annealing curve downward, and thus provide a wider margin if there are large uncertainties in the model parameters and/or furnace control. At the position of the minimum in each step, the annealing cycle experiences the largest departure from optimum $T_f$-T difference and performance. The amplitude of the cycles may be reduced by increasing the number of steps in the annealing schedule, thus matching the cooling rate more closely with the variation of the anneal rate with temperature.

In the specific case of the anneal cycles shown in FIG. 5, the anneal rates at higher temperatures are significantly sub-optimal. However, relaxation of the glass is very fast in that temperature range. Consequently, the cycle passes through the range quickly and the impact on the overall duration of the anneal cycle is therefore minimal.

Figure 6:
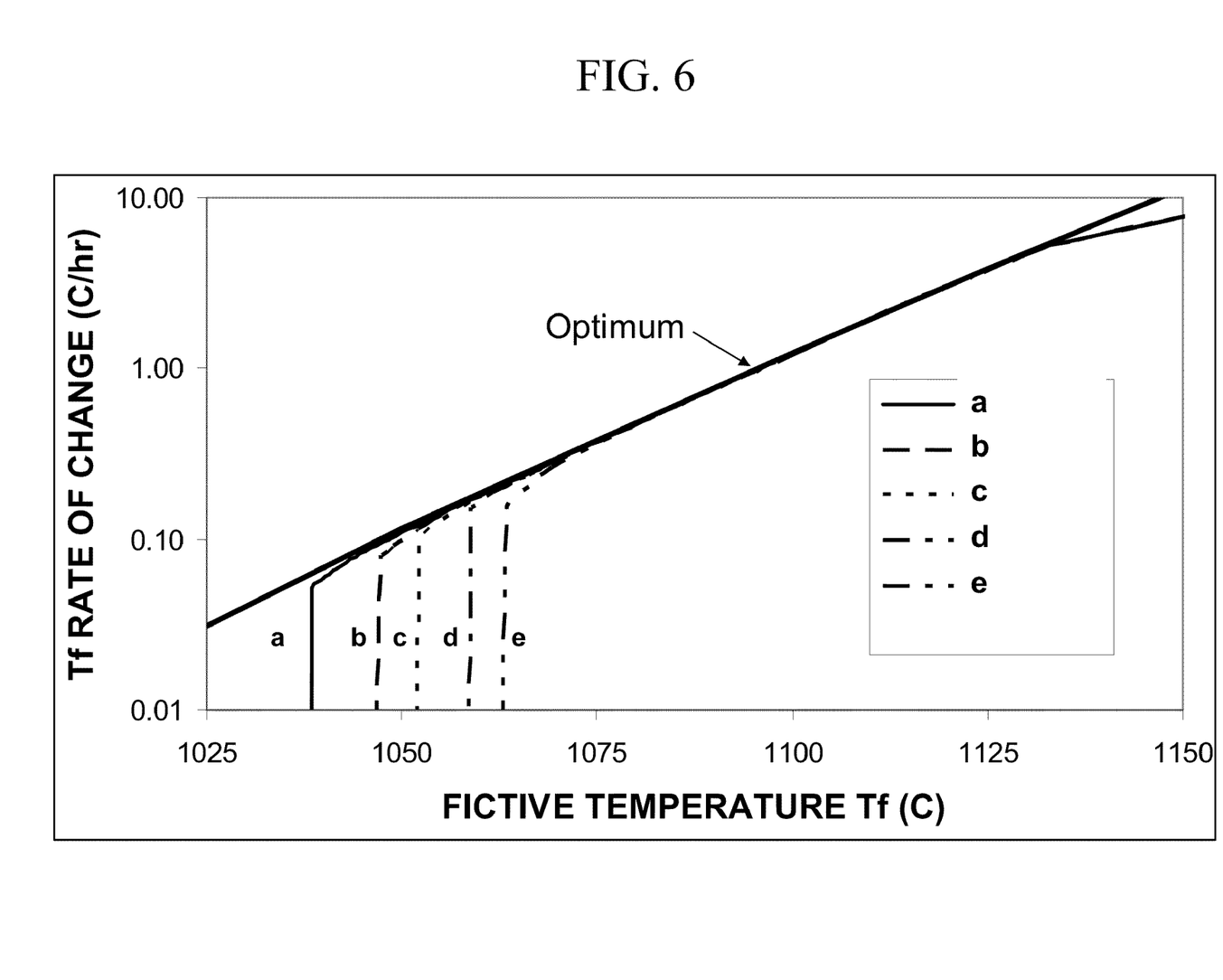
FIG. 6 is a plot of the calculated rate of change of $T_f$ for the annealing cycles shown in FIGS. 4 and 5 as a function of $T_f$.

The calculated rate of change of $T_f$ for the above example cycles is plotted as a function of $T_f$ in FIG. 6. The maximum achievable rate (line 1 in FIG. 6) corresponds to the optimum temperature difference $T_f$-T shown in FIG. 5. FIG. 6 shows that, despite the safety margin in $T_f$-T, the anneal rate is effectively very close to the maximum achievable rate throughout most of each anneal cycle.

The annealing cycles are designed to go into the runaway regime at the low temperature end of the cycle by including the final annealing step. The inclusion of this final annealing step is intended to keep the cooling rate below the optimum temperature difference $T_f$-T (i.e., line 1 in FIG. 5). This causes the anneal rate to progressively decrease, causing the final fictive temperature $T_f$ to be less sensitive to the end temperature (i.e., the temperature at which the cycle switches from a slow anneal rate to a fast cool-down to room temperature). In addition, inclusion of the final annealing step minimizes $T_f$ inhomogeneities caused by temperature profiles within the furnace. The cycles described herein successfully keep $T_f$ within 1° C. of the target fictive temperature when temperature profiles within the furnace are uniform within 5° C.

Figure 7:
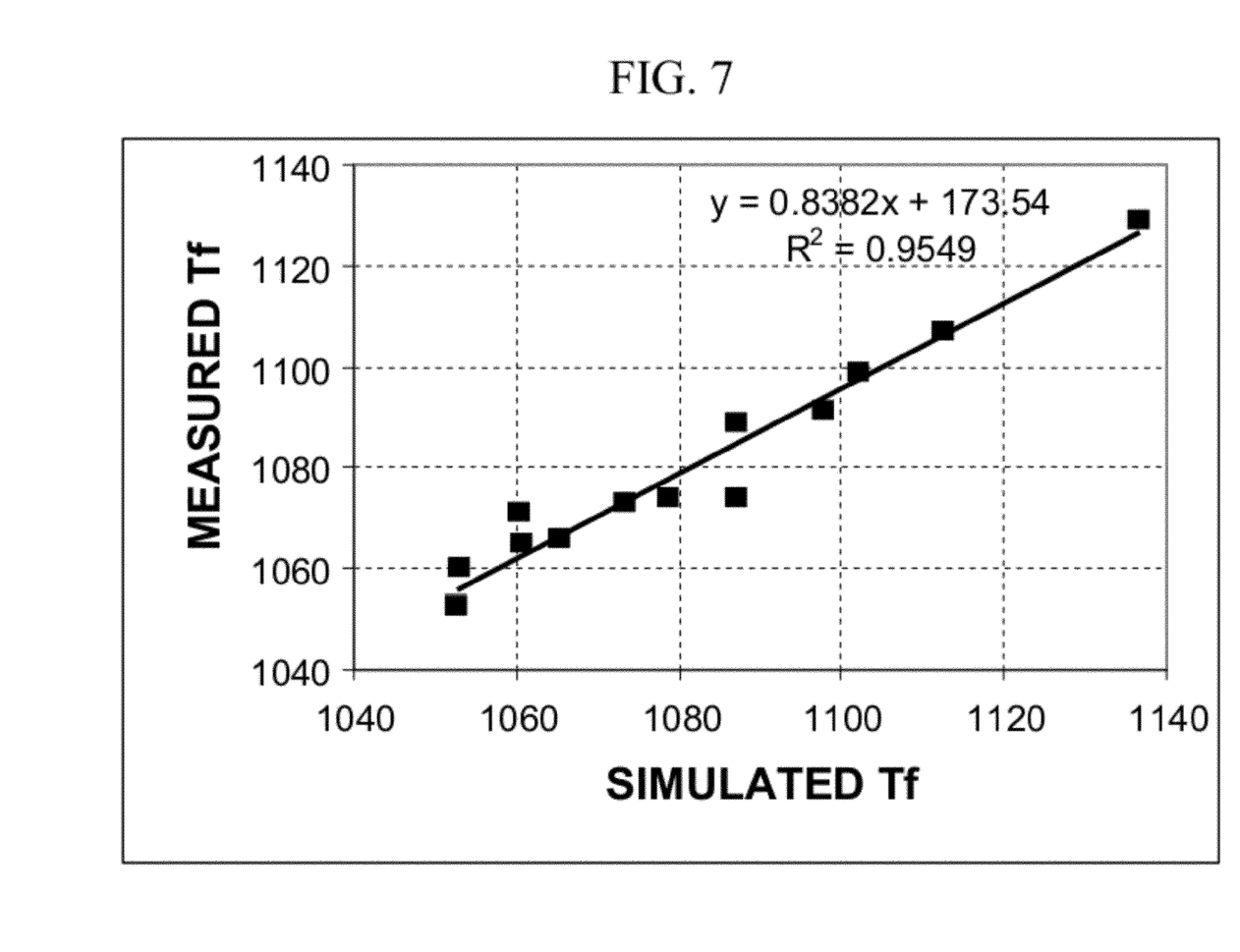
FIG. 7 is a plot comparing measured and calculated fictive temperatures for fused silica.

The predictive ability of the model was tested by exposing fused silica glass samples having low concentrations of protium-containing OH and OD to various heating schedules. The preparation of the fused silica samples has been previously described herein. The fictive temperature $T_f$ of each fused silica sample was measured using the method described herein, and the model was used for predicting a simulated $T_f$ value for each sample based on the heating schedule used. The correlation between the fictive temperatures obtained by $T_f$ measurements and modeling is shown in FIG. 7. FIG. 7 includes the data from the constant cooling rate anneal cycles listed in Table 1 as well as data from variable rate cycles similar to the schedules listed in Table 2.

Figure 8:
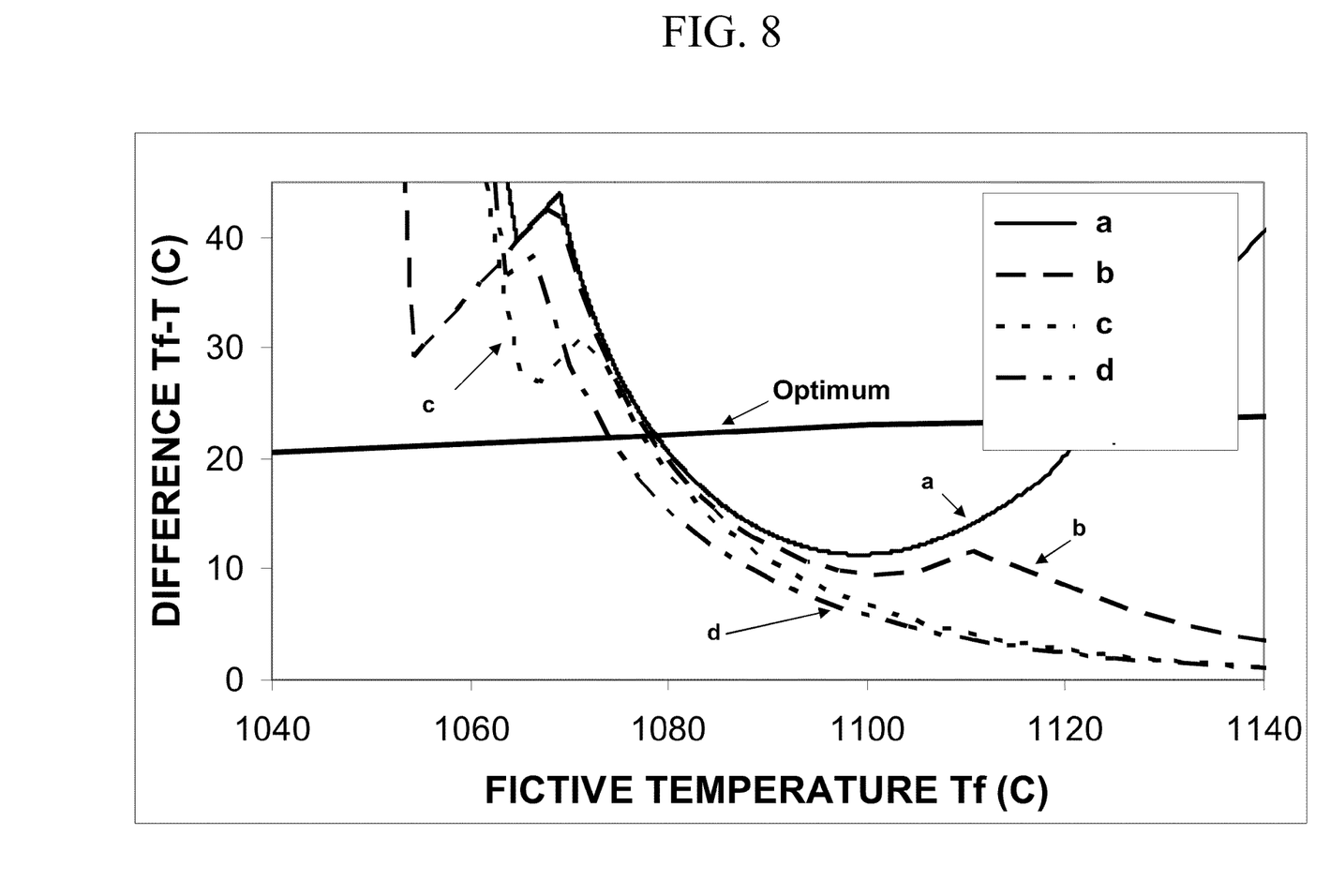
FIG. 8 is a plot of the calculated difference between current values of $T_f$ and the glass temperature T as a function of fictive temperature for four experimental cycles that are included in FIG. 7.
Figure 9:
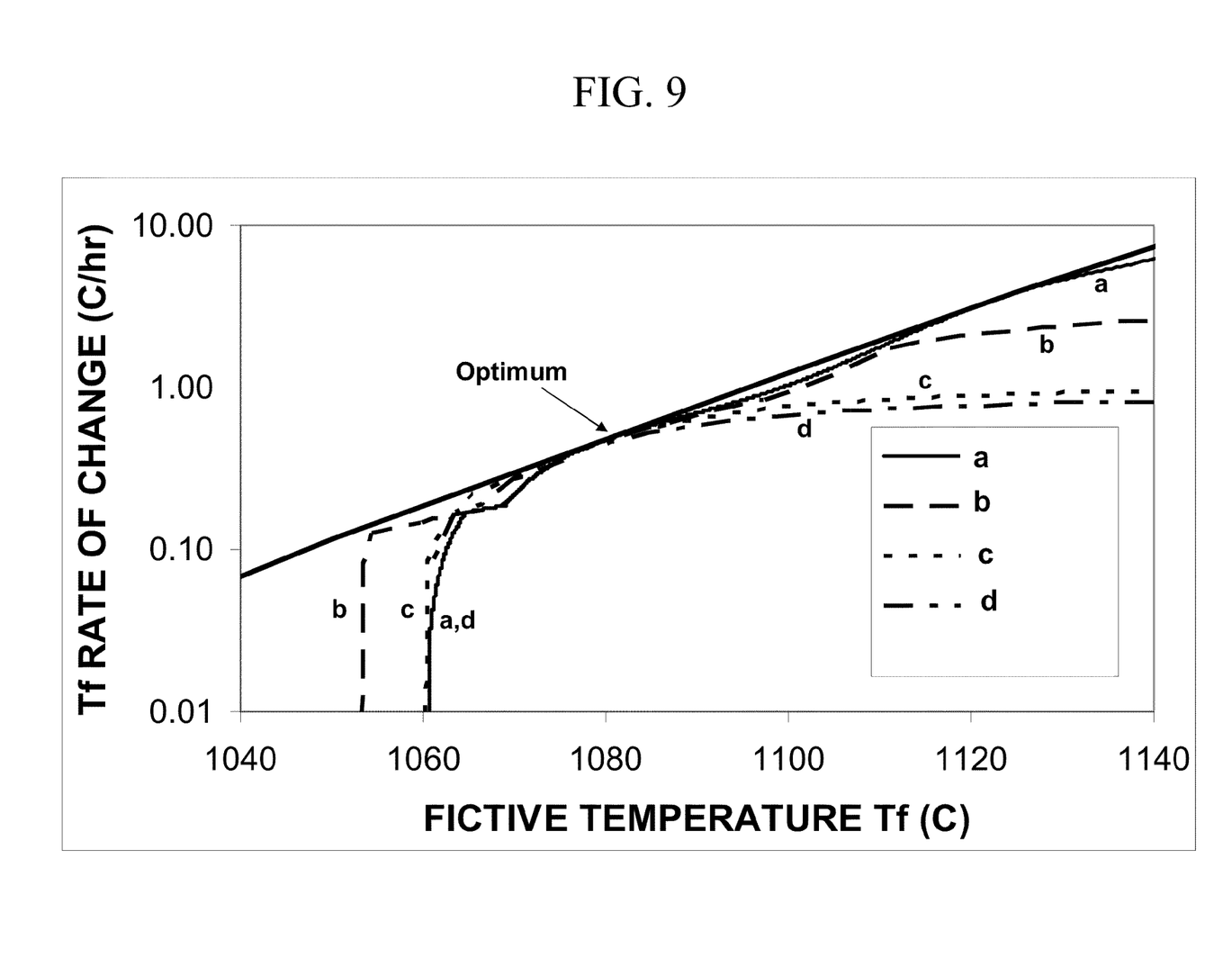
FIG. 9 is a plot of the calculated rate of change of fictive temperature for annealing cycles that include isothermal holds.

Data points from cycles that comprise cooling steps at constant rates combined with isothermal holds are also included in FIG. 7. This type of cycle is particularly important for model validation, as the glass spends a significant fraction of the time at temperatures where the temperature difference $T_f$-T is far from optimal, thus requiring the model to describe the relaxation of the glass over a wider set of conditions. Table 4 lists the heating schedules for four cycles that include such isothermal holds, and FIG. 8 shows the dependence of $T_f$-T upon $T_f$ for these cycles. The straight line sections of the traces in FIG. 8 correspond to the isothermal holds, which are 24 hours long in three samples, and 96 hours long in the remaining sample. The corresponding rate of change of $T_f$ is plotted in FIG. 9 as a function of $T_f$ for the anneal cycles that include isothermal holds. Comparison of FIGS. 8 and 9 with FIGS. 5 and 6, respectively, highlights the difference between the two types of anneal schedules.

TABLE 4

Annealing cycles that include cooling at constant rates combined with isothermal holds.

| | Anneal Cycle | | | |
|---|---|---|---|---|
| Step | a | b | c | d |
| 1 | Room Temp. → 1100° C. at 50° C./hr | Room Temp. → 1200° C. at 600° C./hr | Room Temp. → 1100° C. at 100° C./hr | 1700 → 1300° C. at 200° C./hr |
| 2 | Hold at 1100° C. for 6 hrs | 1200 → 1100° C. at 3° C./hr | Hold at 1100° C. for 0.7 hrs | 1300 → 1200° C. at 8° C./hr |

TABLE 4-continued

Annealing cycles that include cooling at constant rates combined with isothermal holds.

| Step | Anneal Cycle | | | |
|---|---|---|---|---|
| | a | b | c | d |
| 3 | 1100 → 1025° C. at 1° C./hr | 1100 → 1025° C. at 1° C./hr | 1100 → 1250° C. at 100° C./hr | 1200 → 1027° C. at 0.085° C./hr |
| 4 | Hold at 1025° C. for 24 hrs | Hold 96 hrs at 1025° C. | 1250 → 1300° C. at 50° C./hr | Hold at 1027° C. for 27 hrs |
| 5 | 1025 → 975° C. at 1° C./hr | 1025 → 1000° C. at 3° C./hr | Hold at 1300° C. for 1 hr | 1027 → 1005° C. at 7.33° C./hr |
| 6 | 975° C. → Room Temp at 30° C./hr | 1000° C. → Room Temp at 80° C./hr | 1300 → 1200° C. at 10° C./hr | Hold at 1005° C. for 6 hrs |
| 7 | — | — | 1200 → 1046° C. at 1° C./hr | 1005° C. → Room Temp at 30° C./hr |
| 8 | — | — | 1046° C. → Room Temp at 30° C./hr | — |
| $T_f$ Final (° C.) Measured | 1065 | 1060 | 1073 | 1071 |
| $T_f$ Final (° C.) Modeled | 1061 | 1054 | 1074 | 1061 |

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A fused silica article, the fused silica article having a combined concentration of protium-containing hydroxyl groups and deuteroxyl groups of less than about 10 ppm, wherein the fused silica article has an absolute refractive index of less than or equal to 1.560820 at a wavelength of 193.368 nm, and wherein the fused silica article has a fictive temperature of less than 1050° C.

2. The fused silica article of claim 1, wherein the fused silica article has an anneal point of at least 1200° C.

3. The fused silica article of claim 1, wherein the synthetic fused article has a total concentration of metals of less than about 20 ppb by weight, wherein the metals comprise at least one of alkali metals, alkaline earth metals, and transition metals.

4. The fused silica article of claim 1, wherein the fused silica article has a total halogen concentration of less than about 10 ppm by weight.

5. The fused silica article of claim 1, wherein the fused silica article concentration of molecular hydrogen in a range from about $0.5 \times 10^{17}$ molecules/cm$^3$ up to about $100 \times 10^{17}$ molecules/cm$^3$.

6. The fused silica article of claim 1, wherein the fused silica article has a laser induced wavefront distortion of less than 3 nm/cm at 633 nm and less than 4.5 nm/cm at 193 nm when subjected to 4 billion pulses of an ArF laser, each of the pulses having a fluence of 0.5 mJ/cm$^2$ and an integral-square pulse width of 20 ns.

7. The fused silica article of claim 1, wherein the fused silica article has a polarization induced birefringence of less than 0.05 nm/cm at 633 nm and less than 0.07 nm/cm at 193 nm when subjected to 4 billion pulses of an ArF laser, each of the pulses having a fluence of 0.5 mJ/cm$^2$ and an integral-square pulse width of 20 ns.

8. The fused silica article of claim 1, wherein the deuteroxyl groups are present in an isotopic abundance that is greater than the naturally occurring isotopic abundance of deuterium.

9. A fused silica article, the fused silica article having fictive temperature of less than 1050° C. and an anneal point of at least 1200° C., wherein the fused silica article has an absolute refractive index has an absolute refractive index of less than or equal to 1.560820 at a wavelength of 193.368 nm.

10. The fused silica article of claim 9, wherein the fused silica article has a combined concentration of protium-containing hydroxyl groups and deuteroxyl groups of less than about 10 ppm.

11. The fused silica article of claim 10, wherein the deuteroxyl groups are present in an isotopic abundance that is greater than the naturally occurring isotopic abundance of deuterium.

12. A method of annealing a fused silica glass, the method comprising the steps of:
   a. providing a fused silica glass, the fused silica glass having an anneal point, an anneal rate, a strain point, and a fictive temperature;
   b. heating to a first temperature above the anneal point;
   c. cooling the fused silica glass to a second temperature below the strain point at a progressively decreasing cooling rate, wherein the progressively decreasing cooling rate is less than the anneal rate of the fused silica glass; and
   d. cooling the fused silica glass from the second temperature to room temperature at a third cooling rate, thereby annealing the fused silica glass, wherein the annealed fused silica glass has an absolute refractive index of less than or equal to 1.560820 at a wavelength of 193.368 nm and a fictive temperature of less than 1050° C.

13. The method according to claim 12, wherein the step of cooling the fused silica glass to the second temperature below the strain point at the progressively decreasing cooling rate comprises cooling the fused silica glass such that a difference $T_f - T$ between the fictive temperature $T_f$ of the fused silica glass and the temperature T of the fused silica glass is less than a predetermined optimal difference between the fictive temperature $T_f$ of the fused silica glass and the temperature $T$ of the fused silica glass and within a predetermined range of the optimal difference.

14. The method according to claim 12, wherein the step of cooling the fused silica glass to the second temperature below the strain point at the progressively decreasing cooling rate comprises cooling the fused silica glass at a first cooling rate from the second temperature to a third temperature and cooling the fused silica glass at a second cooling rate from the third temperature to a fourth temperature that is below the strain point and greater than room temperature, wherein the third temperature is less than the second temperature and greater than the fourth temperature, and wherein the first cooling rate is greater than the second cooling rate.

15. The method according to claim 14, further comprising the step of holding the fused silica glass at the third temperature for a predetermined time before cooling the fused silica glass to the fourth temperature.

* * * * *